No. 780,110. PATENTED JAN. 17, 1905.
T. J. LOWRY.
COTTON CHOPPER.
APPLICATION FILED APR. 22, 1904.
2 SHEETS—SHEET 1.
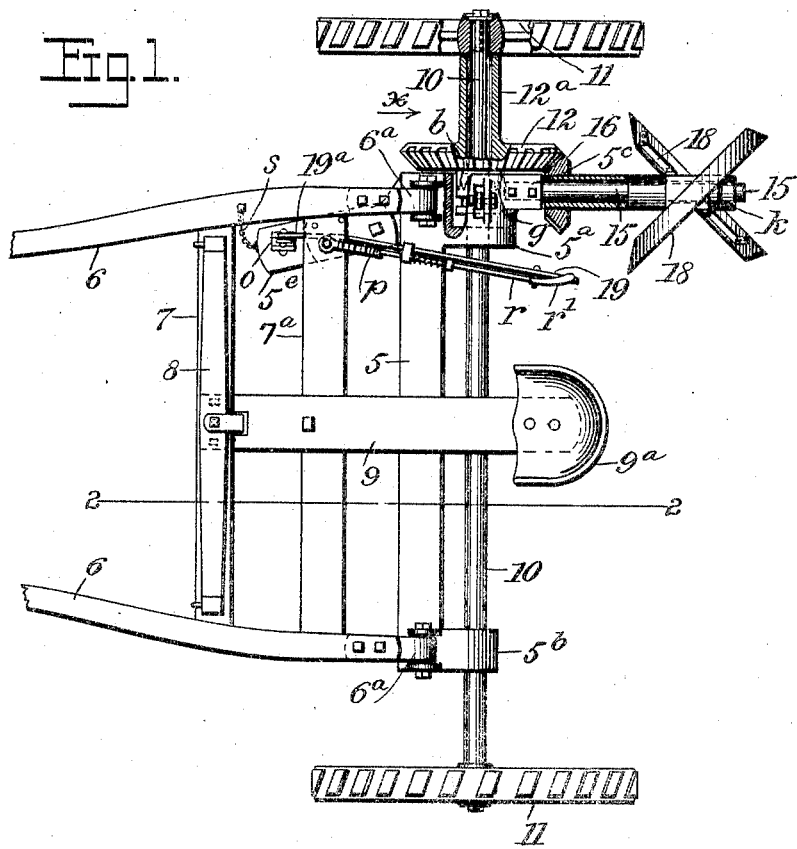
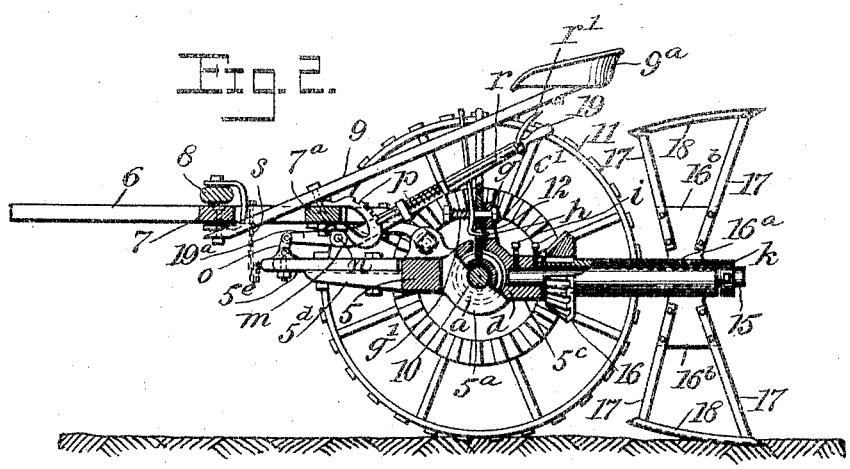
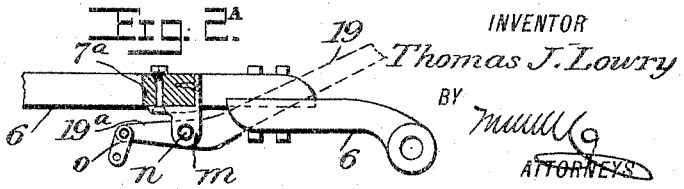
WITNESSES:
L. Almquist
Wm. P. Patton
INVENTOR
Thomas J. Lowry
BY
ATTORNEYS No. 780,110. PATENTED JAN. 17, 1905.
T. J. LOWRY.
COTTON CHOPPER.
APPLICATION FILED APR. 22, 1904.
2 SHEETS—SHEET 2.
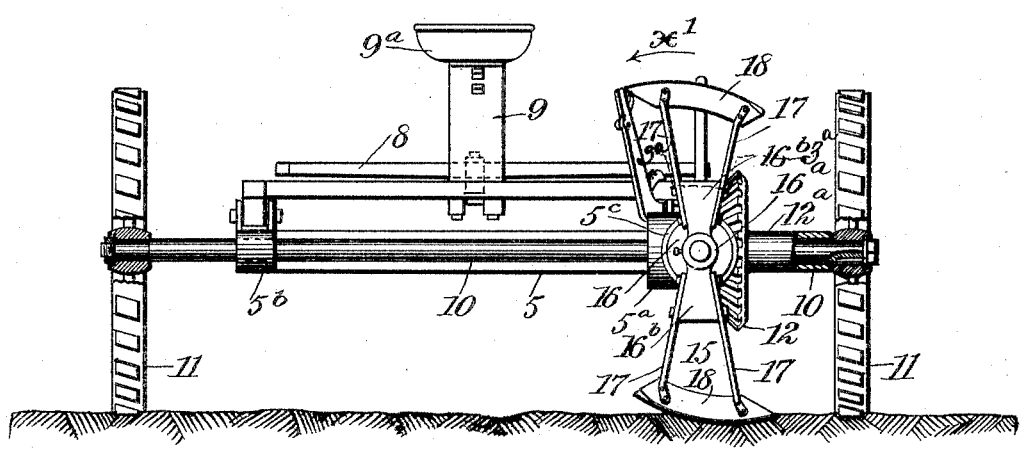
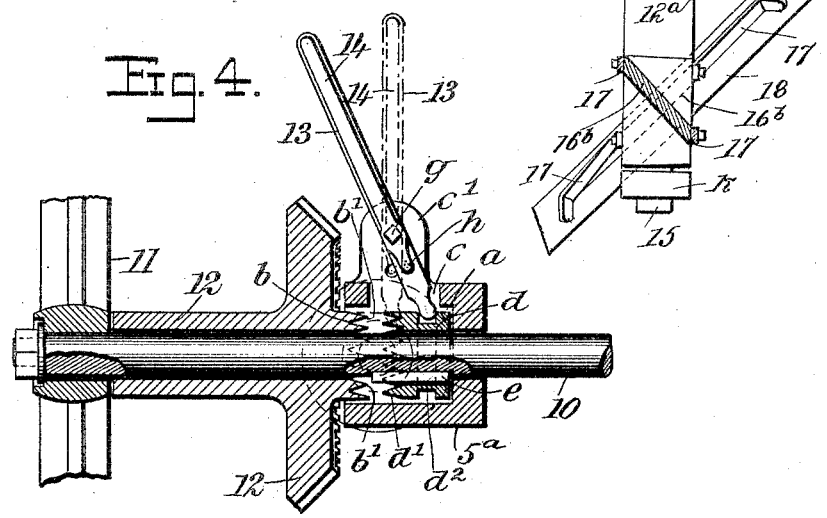
WITNESSES:
L. Almquist
Wm. P. Patton
INVENTOR
Thomas J. Lowry
BY
ATTORNEYS No. 780,110.

Patented January 17, 1905.

UNITED STATES PATENT OFFICE.

THOMAS J. LOWRY, OF MOUNTAIRY, NORTH CAROLINA.

COTTON-CHOPPER.

SPECIFICATION forming part of Letters Patent No. 780,110, dated January 17, 1905.

Application filed April 22, 1904. Serial No. 204,395.

*To all whom it may concern:*

Be it known that I, THOMAS JEFFERSON LOWRY, a citizen of the United States, and a resident of Mountairy, in the county of Surry and State of North Carolina, have invented a new and Improved Cotton-Chopper, of which the following is a full, clear, and exact description.

This invention relates to machines used for the cultivation of cotton-plants and removal of weeds from rows of growing cotton or other plants, and has for its object to provide novel details of construction for a machine of the character indicated that afford a very simple, durable, and conveniently-operated device which may be altered in adjustment quickly to put it into or out of service, as may be required, while the machine is being progressively moved and also to change the depth of the cultivator-blades in the soil to suit the needs of the service.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a plan view of the improved cotton-chopper. Fig. 2 is a longitudinal sectional view on the line 2 2 in Fig. 1. Fig. $2^a$ is an enlarged partly-sectional side view of details of the cutter elevating and depressing mechanism. Fig. 3 is a rear end view of the machine. Fig. $3^a$ is a partly-sectional plan view of the cutting mechanism substantially on the line $3^a$ $3^a$ in Fig. 3, and Fig. 4 is an enlarged longitudinal sectional view of a clutch device that controls the rotary movement of the chopper-blades seen in the direction of the arrow $x$ in Fig. 1.

In the drawings which represent the construction of the improved cotton-chopper, 5 represents a frame-bar for the machine that is preferably cast from metal, and upon the frame-bar the rear ends of a pair of shafts 6 are hinged, as shown at $6^a$ in Fig. 1. Two cross-bars 7 $7^a$ are secured by their ends between the rear portions of the shafts 6, and upon the forward bar 7 a swingletree 8 is loosely secured to enable a proper connection of a draft-animal with the machine.

Upon the rear side of the frame-bar 5, at one end of the same, a hollow box $5^a$ is formed, said box having a cylindrically-walled chamber $a$ therein that is open at the outer end. Another box, $5^b$, is formed upon the opposite end of the frame-bar 5 and projects rearward, as shown in Fig. 1. The boxes $5^a$ $5^b$ are centrally perforated in alinement with each other, and in these perforations a straight and preferably cylindrical axle 10 is loosely fitted.

Upon each end of the axle 10 a ground-wheel 11 is mounted, and the wheel 11 nearest to the box $5^b$—that is, at the left-hand side of the machine—is loosely secured upon the axle, while the other ground-wheel is keyed upon the axle, so as to rotate the latter when the machine is moved over the ground on the wheels 11.

A suitable space is provided between the outer end of the hollow box $5^a$ and the ground-wheel 11 at the right-hand end of the axle 10 to receive a bevel gear-wheel 12, having a sleeve-like hub $12^a$ formed or secured thereon at its center, the bore in the elongated hub $12^a$ loosely receiving the right-hand end of the axle, whereby the bevel gear-wheel 12 is located near the end of the box $5^a$.

As shown clearly in Fig. 4, a clutch member $b$ is formed on the face of the bevel-gear 12 nearest the box $5^a$, this clutch member being in the form of an integral cylindrical hub that projects into the chamber $a$ and is furnished with a series of teeth $b'$ on its free end. An opening $c$ is formed in the upper side of the box $5^a$, and adjacent to one side of said opening a flange $c'$ is projected vertically from the box. In the chamber $a$ is located a clutch member $d$, that is substantially cylindrical and is loosely mounted upon the axle 10 where it passes through the box, teeth $d'$ being formed on the end of this clutch member, which correspond with the teeth $b'$.

A feather-key $e$ is secured longitudinally on or in the axle 10, which key loosely engages a keyway or groove formed in the bore of the clutch member $d$, so that the latter may be moved toward or from the clutch member $b$, but will be caused to rotate with the axle. In the clutch member $d$ a peripheral channel $d^2$ is formed, that is intermediate the ends thereof and loosely receives the rounded lower end of a shifting lever 13, that is pivoted on the nearest side of the upright flange $c'$ and extends upward therefrom for manipulation.

On the pivot-bolt $g$, that the lever 13 is mounted upon and which projects exterior of the lever, at one side thereof, a locking-arm 14 is loosely mounted, which arm projects upward at one side of the lever to receive manual adjustment at its upper end as shown in Fig. 2. A coiled spring $g'$ is mounted on the pivot-bolt $g$ and presses upon the arm 14. A locking-toe $h$ is formed on the lower end of the arm 14, which toe projects toward and through a perforation formed laterally through the lever 13 and extends therethrough a short distance. In the flange $c'$ a perforation is formed at one side of the pivot-bolt $g$ and below it, and when the lever, together with the locking-arm, is rocked toward the bevel-gear 12 at its upper end and the clutch member $d$ is detached from the clutch member $b$ the toe $h$ will be disposed opposite this perforation and if entered therein will hold the clutch member $d$ disconnected from the other clutch member. Another perforation is formed in the path of the toe $h$ through the flange $c'$, but in the same vertical plane with the pivot-bolt $g$, so that the toe $h$ will enter said perforation when the lever 13 and locking-arm 14 are vertically positioned. The clutch member $d$ will engage its teeth $d'$ with the teeth $b'$ on the clutch member $b$ when the lever 13 and locking-arm 14 are together rocked into a vertical position or nearly approaching such an adjustment, which will cause the clutch members to be interlocked and adapt the ground-wheel 11 to transmit rotary motion to the bevel-gear 12. To disconnect the gear 12 from the wheel 11, it is only necessary to press upon the arm 14 at its upper end, that inclines outward from the lever 13, so as to rock the toe $h$ away from the flange $c'$, whereupon the lever 13 may be shifted so as to incline it edgewise toward the gear 12, and it may be locked in such a position by the described means.

Upon the rear side of the box $5^a$ a boss $5^c$ is formed, which is centrally and horizontally perforated, said boss receiving the forward end of the cutter-shaft 15, that is therein secured by set-bolts $i$ or other means. A bevel-pinion 16, having a barrel-hub $16^a$, that is cylindrical and of a suitable length, is loosely mounted upon the cutter-shaft 15, and said pinion, with its elongated cylindrical hub, is held in meshed engagement with the bevel-gear 12 by a collar $k$, secured on the free end of the shaft 15 by a set-screw or the like, as indicated in Fig. 2.

Upon the hub $16^a$ near its rear end two wings $16^b$ are formed that project diametrically opposite therefrom, and upon these wings, that on their edges incline outward an equal degree, similar cutter-bars 17 are bolted or otherwise secured. The two cutter-bars 17 on each wing $16^a$ diverge toward their outer ends a degree that may be defined by the divergence of the edges on said wings. The wings $16^b$ are disposed diagonally to the longitudinal axis of the hub $16^a$, they together having a pitch similar to that of the thread on a coarse screw.

On the outer ends of the cutter-bars 17 two cutter-blades 18 are mounted and secured, said blades each consisting of a steel strip that is originally flat and parallel on the side edges. The cutter-bar on each wing $16^b$ that is nearest to the pinion 16 is somewhat shorter than the other bar thereon, the shorter cutter-bars being of equal length, as are also the longer ones. The cutter-blades 18 are curved an equal degree sidewise and are secured near their ends upon the ends of the cutter-bars, having their convex faces disposed outward, as is indicated in Fig. 2. The relative positions of the diagonally-trending wings $16^b$ with regard to the axis of the hub $16^a$ causes the cutter-blades 18 to lie in planes substantially at right angles with each other, said planes and the blades crossing the axis of the shaft 15 diagonally, as is shown in Fig. 1. The spiral twist of the blades 18 and the dip or depression given to the rear ends of the blades renders their cutting edges eccentric to the axis of the hub $16^a$ and adapts said ends to first engage the soil traversed by the machine, and the rotation of the cutter-blades in the direction of the arrow $x'$ in Fig. 3 will adapt the blades to readily enter the ground and have a shear cutting action, thus severing the weeds and vines that may encumber the soil between rows of the growing plants.

Upon the frame-bar 5, in advance of the box $5^a$, a bracket-arm $5^d$ is secured, that projects inward and forward below the cross-bar $7^a$. On the upper side of the bracket-arm $5^d$ a metal extension-plate $5^e$ is secured, which, in effect, is a prolongation of the bracket-arm, as appears in Figs. 1 and 2.

Upon the lower side of the rear cross-bar $7^a$ a bracketed ear $m$ is secured, as is shown in Figs. 2 and $2^a$, and upon said ear a lever 19 is pivoted. The lever mentioned is flat-sided and bent edgewise near its pivot connection $n$ on the ear $m$, so that the main portion of the lever projects upward and rearward from the pivot $n$, while the shorter member $19^a$ of the lever extends horizontally forward therefrom, as is plainly shown in Fig. $2^a$, and a short link $o$ loosely connects the forward extremity of the lever with a projection on the extension-plate $5^e$.

On the rear cross-bar $7^a$ a segmental rack $p$ is secured, the toothed convex edge of which is adapted for interlocking engagement with the toe or lower end on a spring-pressed detent-rod $r$, that is held to slide on a side of the lever 19, said rod being actuated longitudinally to release it from engagement with the teeth of the rack $p$ by a handle $r'$, this arrangement of parts being similar to the well-known reversing-lever employed on portable or traction engines. It will be obvious that if the handle $r'$ is depressed the toe of the detent-rod $r$ will be withdrawn from the rack $p$ and the lever 19 may be rocked to raise or depress the rear end of the hub $16^a$, together with the wings $16^b$ and cutter-blades 18, as occasion may require, the latter being thereby held firmly until the adjustment of the lever 19 is changed.

Upon the cross-bars 7 $7^a$ near their centers a seat-supporting spring-bar 9 is secured so as to project rearward of the axle 10, and upon the rear end of said upwardly-trending spring-bar a seat $9^a$ is secured for the accommodation of the driver of the machine, and it will be seen that the weight thus imposed will effect a proper embedment of the ground-wheels 11, and thus insure the proper transmission of rotary motion to the cutter-blades 18 when the machine is progressively moved. The position of the person occupying the seat $9^a$ enables him to grasp the levers 13 or 19 and manipulate them, the lever 13 controlling the rotary movement of the cutter-blades 18 and the lever 19 affording means for raising or lowering said blades.

A short flexible connection, such as a chain $s$, is connected by its ends respectively upon the forward end of the extension-plate $5^e$ and one shaft 6, this chain serving to limit the rocking movement of the arm $5^d$ and its extension $5^e$, which will prevent too great an elevation of the cutter-blades and their supports.

In operating the machine the ground-wheels 11 pass between rows of the growing cotton-stalks, and the cutter-blades 18 are thus rotated rapidly in a direction to loosen the soil close to the plants and cut off the roots of weeds or the like, as well as suckers that sprout from the roots of the cotton-stalks. It will be understood from the foregoing description of parts that the cutter-blades may be lowered to give them greater depth in the soil as they operate, or they may be quickly raised from the ground, so as to avoid obstructions, facilitate the turning of the machine around, or prevent contact with the ground when the machine is moved to or from the field, the rotation of the cutter-blades being effected by a proper adjustment of the lever 13 and locking-bar 14, while the rocking movement of the cutter frame and blades is controlled by the lever 19.

The peculiar novel construction of the cutter-head, composed of the hub $16^a$, wings $16^b$, bars 17, and blades 18, whereby the cutting edges and rear ends of the diagonally-disposed blades are disposed eccentrically to the axis of the shaft 15, is a leading feature of this improvement, other novel details that coact therewith being embodied in the means shown and described for releasably locking the cutter-head in operative relation with the near ground-wheel 11 and also in the means for rocking the cutter-frame toward and from the ground and retaining said frame at any desired point of rocking adjustment.

Having thus described my invention, I claim as new and desire to secure by Letters Patent—

1. In a cotton-chopper, a rotatably-supported cutter-head embodying a hub, two wings opposite on the hub and set diagonally to the axis of said hub, bars projected from the wings, the bars on each wing having different length, and a cutter-blade fixed on the outer ends of the bars on each wing, said blade for each wing having its cutting edge disposed eccentrically to the axis of the hub, so that like ends of the cutter-blades enter the ground first.

2. In a cotton-chopper, a rotatably-supported cutter-head embodying an elongated hub, wings projected oppositely and diagonally from the hub, bars on each wing, near their edges and diverged therefrom toward their outer ends, one bar on each wing being of a less length than the other bar thereon, and an outwardly-arched plate-like cutter-blade secured on the outer ends of the bars on each wing, the difference in length of the arms on each wing causing the rear ends of the cutter-blades to enter the ground first and their edges to have a shear cut on the weeds they engage.

3. In a cotton-chopper, a cutter-head comprising a supported horizontal shaft that is not rotatable, an elongated hub loosely held on said shaft, two wings diagonally projected from opposite points on the hub, their planes crossing at a right angle, cutter-bars varying in length and projected from the wings, and plate-like cutter-blades mounted on the outer ends of the bars, said blades arching outwardly and trending eccentrically to the axis of the shaft, so that the rear ends of the blades are adapted to enter the soil first and their cutting edges to sever the weeds with a shear cut.

4. In a cotton-chopper, an axle, a ground-wheel fixed on one end of the axle, a similar ground-wheel loosely secured on the other end of the axle, a main frame having boxes and held to rock on the axle therewith, one box having an outwardly-opening chamber therein, a bevel-gear having an elongated hub and mounted on the axle between the fixed ground-wheel and the chambered box, a clutch member on the bevel-gear adjacent to the hollow box, a clutch member held to slide on the axle toward and from the other clutch member, a shaft extended horizontally from the rear side of the chambered box, a hub having a pinion thereon and loosely mounted on the shaft, cutter-bars projected from the hub, and cutter-blades mounted on the outer ends of the bars.

5. In a cotton-chopper, a rockable main frame carried by an axle mounted upon ground-wheels, a rotatable cutter-head supported on said frame at the rear side of the axle, an arm projected forwardly on said frame at the front side of the axle, and a flexible connection extended from the arm to one of a pair of shafts carried by the main frame, said connection checking an excessive rocking movement of the arm and frame.

6. In a cotton-chopper, a wheel-supported axle, a main frame held to rock on the axle, a cutter mechanism carried by the main frame at the rear side of the axle, an arm extended from the main frame at the forward side of the axle, a pair of shafts hinged on the main frame, a segmental rack mounted upon one shaft, a lever bent edgewise and pivoted near the bend on a depending projection from a cross-bar of the pair of shafts, a link connecting the forward end of the lever with the front end of the extended arm, and an adjustable locking-rod adapted to engage notches in the rack for holding the lever, whereby the main frame is secured at a desired point of rocking adjustment.

In testimony whereof I have signed my name to this specification in the presence of two subscribing witnesses.

THOS. J. LOWRY.

Witnesses:
S. F. LOWRY,
GEO. W. LEE, Jr.